(12) United States Patent
Christian et al.

(10) Patent No.: US 8,099,342 B1
(45) Date of Patent: Jan. 17, 2012

(54) METHODS AND APPARATUS FOR CENTRALIZED GLOBAL TAX COMPUTATION, MANAGEMENT, AND COMPLIANCE REPORTING

(75) Inventors: Eric Thomas Christian, Beaverton, OR (US); John Davidson Brandt, Portland, OR (US)

(73) Assignee: Sabrix, Inc., Lake Oswego, OR (US)

( * ) Notice: Subject to any disclaimer, the term of this patent is extended or adjusted under 35 U.S.C. 154(b) by 569 days.

(21) Appl. No.: 10/037,035

(22) Filed: Jan. 2, 2002

(51) Int. Cl.
*G06F 17/22* (2006.01)
*G07F 19/00* (2006.01)

(52) U.S. Cl. ......................................................... 705/31
(58) Field of Classification Search ....................... 705/31
See application file for complete search history.

(56) References Cited

U.S. PATENT DOCUMENTS

| | | | | |
|---|---|---|---|---|
| 5,734,887 | A | | 3/1998 | Kingberg et al. |
| 5,774,872 | A | * | 6/1998 | Golden et al. .................. 705/19 |
| 5,799,283 | A | * | 8/1998 | Francisco et al. ............... 705/19 |
| 5,878,400 | A | * | 3/1999 | Carter, III ....................... 705/20 |
| 6,108,712 | A | * | 8/2000 | Hayes, Jr. ...................... 709/246 |
| 6,311,165 | B1 | * | 10/2001 | Coutts et al. ................... 705/21 |
| 6,810,410 | B1 | * | 10/2004 | Durham ......................... 709/203 |
| 6,885,860 | B2 | | 4/2005 | Bahl et al. |
| 6,993,502 | B1 | | 1/2006 | Gryglewicz et al. |
| 2002/0010665 | A1 | * | 1/2002 | Lefebvre et al. ................ 705/31 |
| 2002/0052792 | A1 | | 5/2002 | Johnson |
| 2003/0041045 | A1 | | 2/2003 | Sun |
| 2003/0055754 | A1 | | 3/2003 | Sullivan |
| 2003/0065949 | A1 | | 4/2003 | Le |
| 2003/0093320 | A1 | | 5/2003 | Sullivan |
| 2003/0101112 | A1 | | 5/2003 | Gallagher |
| 2004/0030619 | A1 | | 2/2004 | Stokes et al. |
| 2004/0049437 | A1 | | 3/2004 | Brickman et al. |

OTHER PUBLICATIONS www.vertexinc.com found at www.archive.com—archived on the Internet on Apr. 22, 1999.*
Champagne, Luna Office Action, dated Jul. 16, 2009 from U.S. Appl. No. 10/869,812 (16 pages).
Champagne, Luna Office Action, dated Feb. 18, 2010 from U.S. Appl. No. 10/869,812 (19 pages).
Champagne, Luna Office Action, dated Jul. 21, 2010 from U.S. Appl. No. 10/869,812 (17 pages).
Champagne, Luna; Restriction Requirement from U.S. Appl. No. 10/869,812, dtd Feb. 17, 2009 (6 pgs).
Applicant's Response to Restriction Requirement from U.S. Appl. No. 10/869,812 dtd Feb. 17, 2009; dtd Mar. 25, 2009 (2 pgs).
Applicant's Response to OA dated Jul. 16, 2009 from U.S. Appl. No. 10/869,812, dtd Oct. 13, 2009 (9 pgs).

(Continued)

*Primary Examiner* — Asfand Sheikh
(74) *Attorney, Agent, or Firm* — Ater Wynne LLP

(57) ABSTRACT

Methods, apparatus, and articles of manufacture for tax computation, management, and compliance reporting via a centralized transactional tax platform capable of incorporating transaction data and/or tax information from multiple locations and/or multiple business applications via a network architecture are disclosed herein. In one embodiment, a central server may be configured to execute an application to generate a user interface to enable configuration of tax compliance data via a network link, to receive transaction data from one or more client systems via the network, to calculate transaction taxes corresponding to the transaction data, and to store tax information, including outputs and computational logic generated by tax calculation engines executed by the server. In another embodiment, the tax calculations may be executed client-side, while administration of tax compliance data and reporting are facilitated by the central server.

24 Claims, 13 Drawing Sheets

OTHER PUBLICATIONS

Champagne, Luna; Interview Summary from U.S. Appl. No. 10/869,812, dtd Sep. 22, 2009 (2 pgs).

Champagne, Luna; Non-final OA from U.S. Appl. No. 10/869,812, dtd Feb. 18, 2010 (19 pgs).

Applicant's Response to OA dated Feb. 18, 2010 from U.S. Appl. No. 10/869,812; dtd May 18, 2010 (31 pgs).

Champagne, Luna; Interview Summary from U.S. Appl. No. 10/869,812; dtd May 24, 2010 (3 pgs).

Applicant's Response & Amendment to Final Office Action from U.S. Appl. No. 10/869,812 Jul. 21, 2010; dtd Oct. 7, 2010 (7 pgs).

Applicant's Request for Continued Examination from U.S. Appl. No. 10/869,812, dtd Nov. 30, 2010 (3 pgs).

* cited by examiner

| STATE NEXUS | | | GROUP: DEFAULT ▼ |
|---|---|---|---|

601 → STATE TAX
603 → LOCAL TAX
617 → GROUP

| STATE | STATE TAX | NONE | ALL LOCALE | INCLUDE | EXCLUDE |
|---|---|---|---|---|---|
| ALABAMA | ✓ | ○ | ○ | ○ | ● |
| ALASKA | ✓ | ○ | ● | ○ | ○ |
| ARIZONA | ✓ | ○ | ● | ○ | ○ |
| ARKANSAS | ✓ | ○ | ● | ○ | ○ |

609 → NONE (Alabama), 611 → ALL LOCALE (Alabama), 607 → INCLUDE (Alabama), 605 → EXCLUDE (Alabama)

*FIG. 6A*

LOCAL NEXUS     STATE: ALABAMA ▼

615 → ADD

| CITIES | DELETE |
|---|---|
| LITTLE TEXAS | ☐ |
| SURGINER | ☐ |
| BARBOUX | ☐ |

613 → DELETE

*FIG. 6B*

PRODUCT CROSS REFERENCE

CROSS REF. GROUP: [COMPANY ▼] ← 801

| INTERNAL PRODUCT CODE | PRODUCT GROUP | PRODUCT |
|---|---|---|
| [          ] | [DEFAULT ▼] | [          ] [FIND] |

PRODUCT DETAILS   PRODUCT: [XYZ89] ← 809  [FIND]

XYZ89 - FREIGHT/SHIPPING CHARGES: GOODS SHIPPED DIRECTLY TO A PURCHASER VIA COMMON CARRIER  ← 815

[STATE RULES] 813  [COUNTY EXCPT.]  [CITY EXCPT.] ← 817  811  819

| STATE | EFFECTIVE | STATE | COUNTY | CITY | TRANSIT | |
|---|---|---|---|---|---|---|
| ALABAMA | 06/01/1999 | EXEMPT | EXEMPT | EXEMPT | EXEMPT | [DTLS] |
| ILLINOIS | 01/01/1997 | EXEMPT | EXEMPT | EXEMPT | EXEMPT | [DTLS] |
| MAINE | 07/01/2001 | EXEMPT | EXEMPT | EXEMPT | EXEMPT | [DTLS] |

833  821  825  827  829  831

[ALABAMA ▼] [    ▼] [EXP ▼] [EXP ▼] [EXP ▼] [EXP ▼] ← 823

*FIG. 8B*

RULE DETAILS   JURISDICTION: ALABAMA   PRODUCT CODE: XYZ89

CURRENT RATE: 0
PRIOR RATE: 0                    RATE 1: 0
USE MAX RATE: Y
EFFECTIVE DATE: 06/01/1999
AMOUNT: $0
TAXABLE: $0                [OK]   [CANCEL]

*FIG. 8C*

```
123456  20011028  NANETTE SIMON  1  CHAIR        1  149.99

123456  20011028  NANETTE SIMON  2  DESK         3  349.99

123456  20011028  NANETTE SIMON  3  CUBE WALL    4  499.99
```

```
<INDATA>
    <MERCHANT_NAME>COMPANY</MERCHANT_NAME>
    <MERCHANT_ROLE>SELLER</MERCHANT_ROLE>
    <INVOICE>
        <INVOICENUM>123456</INVOICENUM>
        <INVOICEDATE>20011028</INVOICEDATE>
        <CUSTNAME>NANETTE SIMON</CUSTNAME>
        <LINE ID="1">
            <LINENUM>1</LINENUM>
            <PRODCODE>CHAIR</PRODCODE>
            <QUANTITY>1</QUANTITY>
            <GROSSAMT>149.99</GROSSAMT>
        </LINE>
        <LINE ID="2">
            <LINENUM>2</LINENUM>
            <PRODCODE>DESK</PRODCODE>
            <QUANTITY>3</QUANTITY>
            <GROSSAMT>349.99</GROSSAMT>
        </LINE>
        <LINE ID="3">
            <LINENUM>3</LINENUM>
            <PRODCODE>CUBE WALL</PRODCODE>
            <QUANTITY>4</QUANTITY>
            <GROSSAMT>499.99</GROSSAMT>
        </LINE>
    </INVOICE>
</INDATA>
```

*FIG. 10C*

METHODS AND APPARATUS FOR CENTRALIZED GLOBAL TAX COMPUTATION, MANAGEMENT, AND COMPLIANCE REPORTING

TECHNICAL FIELD OF THE INVENTION

This disclosure relates generally to tax computation and management tools, and more particularly, but not exclusively, to methods, apparatus, and articles of manufacture for tax computation, management, and compliance reporting via a centralized transactional tax platform capable of incorporating transaction data and tax information from multiple locations and/or multiple business applications via a network architecture.

BACKGROUND INFORMATION

As geographic barriers to new markets and new sources of supply continue to disappear, organizations are doing business on an increasingly wider scale, frequently, throughout the world. One consequence of doing business in many locales is an increase in the complexity of an organization's procedures designed to facilitate tax compliance. Because of political boundary variations, changing laws and regulations, new forms of products, and new business innovations, transaction taxes and tax compliance represent a substantial part of any organization's cost structure. In the United States alone, there are over 7,500 tax jurisdictions, including states, cities, counties, and subsections of cities and counties. The location of an organization's warehouses, stores, and/or customers may all impact the organization's tax obligations as it does business electronically, or via traditional "brick and mortar" mechanisms.

Transaction taxes generally relate to the transfer (i.e., the purchase or sale) of goods and/or services. Special transactional taxes may exist in various locales for certain types of goods (e.g., alcohol may by subject to an excise tax, or communications services may be subject to a telecom tax), but generally, there are three main categories of transactional taxes: Turnover tax; sales and use tax; and, value added tax. While all three categories of taxes represent a tax on the sale of supplies (i.e., goods and/or services), they differ in many important ways, such as how the tax is calculated and to whom the tax is owed, thereby further complicating tax compliance procedures and reporting. In addition, considerations such as exemptions, specially negotiated rates, and the like, must be taken into consideration by an organization's tax professional in order to prevent miscalculation of taxes, which may lead to overpayment, or penalties for underpayment.

As an organization's scope of business and geographic footprint expand, it becomes increasingly difficult to consolidate data and tax information corresponding to transactions taking place at varying locations throughout the organization, or in conjunction with a variety of business applications. Current tax computation and management tools are capable of being integrated with only a single business application. As a consequence, an organization having multiple business applications, or multiple locations, requiring transactional tax calculations, must incur substantial up-front costs to integrate existing point solutions for tax compliance with each application or physical location. Furthermore, even in organizations with existing separate point solutions, there is no mechanism to facilitate an integrated reporting scheme without expensive and cumbersome customization, thereby unnecessarily increasing the workload of the organization's tax professional on simple compliance and reporting issues.

Having dispersed, non-synchronized records, generated by separate point solutions integrated with individual business applications increases the time spent by the tax professional dealing with the collection and consolidation of tax-related information in order to report and remit taxes to a variety of taxing authorities. Time spent collecting, consolidating, updating, and reporting tax compliance information substantially diminishes the time spent on tax strategy, which may result in an unnecessary drain of valuable resources.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein:

FIGS. 6A-6B are illustrations of example user interface ("UI") displays to administer an organization's nexus in accordance with the teachings of the present invention;

FIGS. 8A-8C are illustrations of example UI displays to administer an organization's products in accordance with the teachings of the present invention;

FIG. 10C is an illustration representing an Extensible Markup Language ("XML") data transfer method for electronically communicating information from the example invoice document of FIG. 10A in accordance with the teachings of the present invention;

DETAILED DESCRIPTION OF THE ILLUSTRATED EMBODIMENTS

Figure 1:
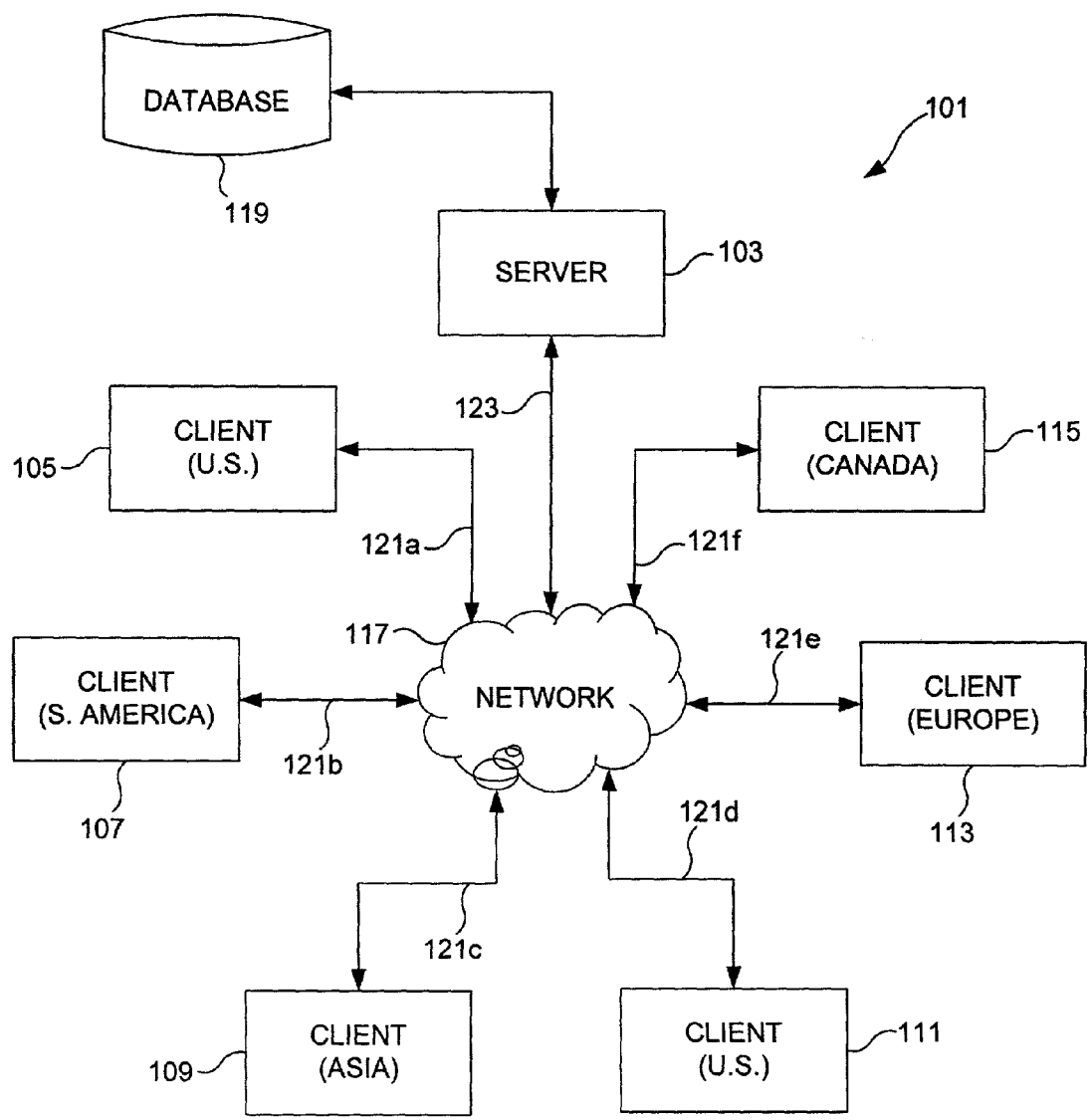
FIG. 1 is a block diagram of one embodiment of a network environment in accordance with the teachings of the present invention.

Embodiments of methods, apparatus, and articles of manufacture for centralized tax computation, management, and compliance reporting are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments in accordance with the teachings of the present invention provide methods, apparatus, and articles of manufacture for tax computation, management, and compliance reporting via a centralized transactional tax platform capable of incorporating transaction data and/or tax information from multiple locations and/or multiple business applications via a network architecture. In one embodiment, a central server, configured to execute an application for managing the configuration, administration, and reporting associated with global tax transactions, may be communicatively coupled to a plurality of intra-organizational client systems located throughout the world. Each of the plurality of client systems may be configured to execute one or more business applications to enable transactions, or to gather information related to transactions, in an embodiment.

In one embodiment, transaction data corresponding to the transactions may be communicated to the central server via a network communication link from a calling client system. Upon receiving the transaction data, the central server may execute instructions to calculate any appropriate transaction taxes, store tax-related information corresponding to the transaction such as audit information, a record of calculation logic and output, or the like, and respond to the calling client system with an indication of the calculated transaction taxes associated with the transaction or series of transactions. In another embodiment, taxes may be calculated client-side via separate tax calculation engines administered by the central server. In this scenario, updates of tax tables, for example, as well as other tax compliance configuration data, may be communicated to the client systems for incorporation into the separate tax calculation engines. In addition, tax information, corresponding to the calculated transaction taxes, may then be communicated to the central server for storage to facilitate centralized tax compliance and reporting while minimizing customization and maintenance costs for the organization. Other features of the illustrated embodiments will be apparent to the reader from the foregoing and the appended claims, and as the detailed description and discussion is read in conjunction with the accompanying drawings.

With reference now to the drawings, and in particular to FIG. 1, an embodiment of a network environment 101 is illustrated in accordance with the teachings of the present invention. In one embodiment, a server 103 may be communicatively coupled to a plurality of client systems 105, 107, 109, 111, 113, and 115 via a network 117. In one embodiment, the client systems 105-115 are capable of connecting to the network 117 via individual communication links 121a, 121b, 121c, 121d, 121e and 121f, respectively, while the server 103 is capable of connecting to the network 117 via a communication link 123.

In one embodiment, the communication links 121a-121f, and 123 may be used by the client systems 105-115, and the server 103, respectively, to send and/or receive information from one another, such as for example, but not limited to, configuration data, transaction data, and/or tax information. In one embodiment, the communication links 121a-121f, and 123 may comprise physical connections, such as for example, cables, wires, optical fibers, or the like. In another embodiment, the communication links 121a-121f, and 123 may comprise wireless links, such as for example, radio frequency ("RF") links, satellite transmissions, optical signals, or the like, transmitted through the atmosphere, or any combination of the foregoing. In one embodiment, the network 117 may be any type of communications network through which a plurality of different devices may communicate, such as for example, but not limited to, the Internet, a wide area network ("WAN"), a local area network ("LAN"), an intranet, or the like, or any combination of networks interconnected with one another.

In one embodiment, the server 103 and the plurality of client systems 105-115 may comprise elements of a single organization (also referred to herein as a "company") with physical locations throughout various parts of the world and/ or the United States. For example, in the illustrated embodiment, the client systems 105 and 111 may be located at two distinct locations within the United States, while the client system 107 may be located in South America, the client system 109 may be located in Asia, the client system 113 may be located in Europe, and the client system 115 may be located in Canada. It will be appreciated that the locations of the client systems 105-115 described herein and illustrated in FIG. 1 are provided as examples only, and that the location and number of the client systems 105-115 may vary in other embodiments in accordance with the teachings of the present invention.

In one embodiment, the server 103 may be coupled to a central storage, such as a database 119, to store data such as current tax tables, computational algorithms, organization nexus and location information, customer data, product codes and cross references, as well as exceptions and exemptions to standard tax provisions within various tax jurisdictions and/ or tax zones, and the like, to facilitate the calculation of transactional taxes corresponding to transactions occurring in various locales. In addition, the database 119 may store data including tax information such as audit data, compliance reports, and the like, to facilitate tax compliance within the various locales, taxing jurisdictions, or tax zones in which the transactions are taking place. In one embodiment, the database 119 may also include product information, which, in conjunction with taxing jurisdictions, may facilitate an analysis of sales data for the organization.

Figure 2:
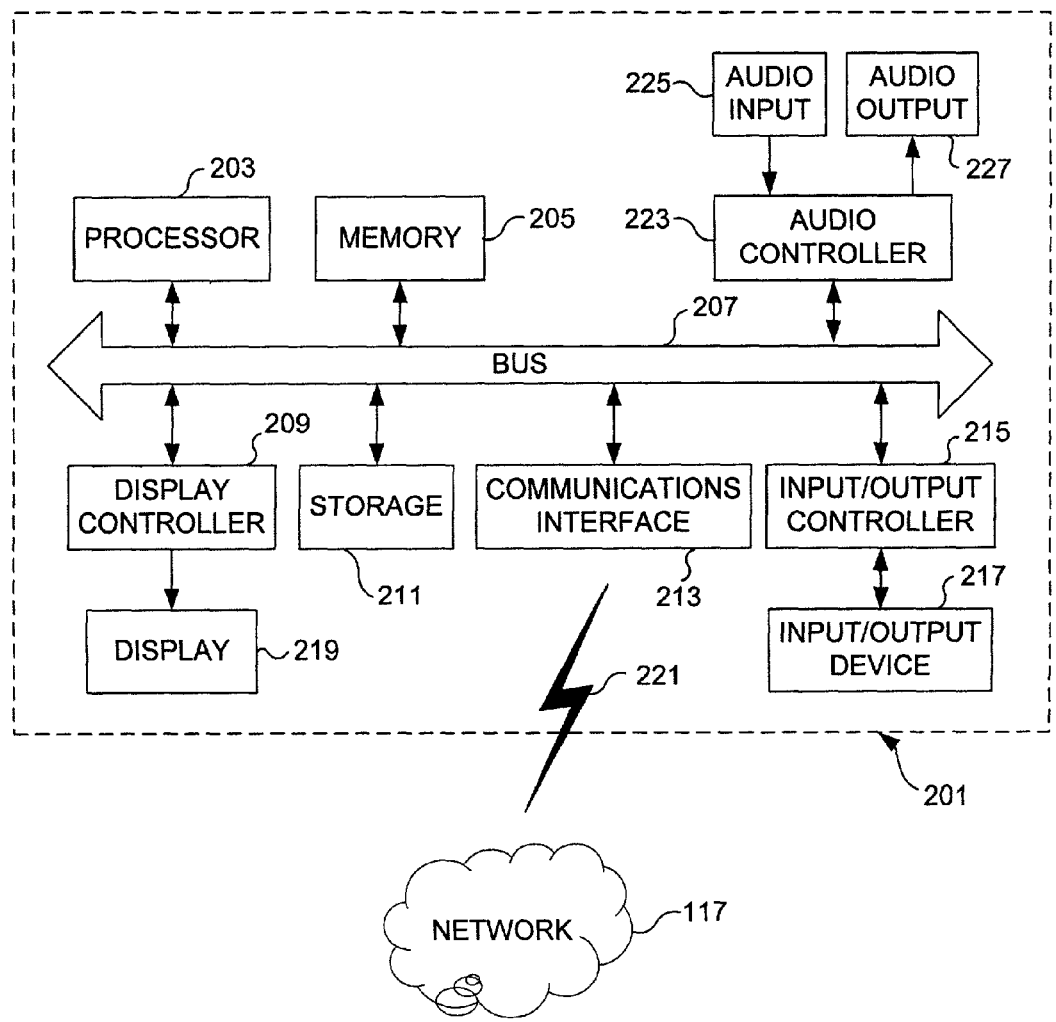
FIG. 2 is a block diagram of one embodiment of a computer system representative of a client system or a server in accordance with the teachings of the present invention.

With reference now primarily to FIG. 2, a block diagram illustrating one embodiment of a machine 201, representative of the server 103 and/or the client systems 105-115, is shown in accordance with the teachings of the present invention. Typically, the server 103 may comprise a computer server or similar type of server hardware that is designed to communicate with a plurality of other machines. The clients 105-115 may comprise various types of machines, including a desktop computer or a workstation, for example, but may also comprise a computer server or similar type of server hardware that is designed to communicate with a plurality of other machines. In one embodiment, the machine 201 is a computer that includes a processor 203 coupled to a bus 207. In one embodiment, a memory 205, a storage 211, a display controller 209, a communications interface 213, an input/output controller 215, and an audio controller 223 are also coupled to the bus 207.

In one embodiment, the machine 201 interfaces to external systems through the communications interface 213. The communications interface 213 may include a radio transceiver compatible with various modulated signals, wireless telephone signals, or the like. The communications interface 213 may also include an Ethernet adapter, an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a carrier wave signal 221 is received/transmitted between the communications interface 213 and the network 117. In one embodiment, the communications signal 221 may be used to interface the machine 201 with another computer system, a network hub, a router, or the like. In one embodiment, the carrier wave signal 221 is considered to be machine-readable media, which may be transmitted through wires, cables, optical fibers, or through the atmosphere, or the like.

In one embodiment, the processor 203 may be a conventional processor, such as for example, but not limited to, an Intel® x86 processor, or Pentium® family microprocessor, a Motorola® family microprocessor, or the like. The memory 205 may be a machine-readable medium such as dynamic random access memory ("DRAM"), and may include static random access memory ("SRAM"). The display controller 209 controls, in a conventional manner, a display 219, which in one embodiment may be a cathode ray tube ("CRT"), a liquid crystal display ("LCD"), an active matrix display, or the like. An input/output device 217, coupled to the input/output controller 215 may be a keyboard, a disk drive, a printer, a scanner, or other input/output device, including a mouse, a trackball, a trackpad, a joystick, or the like. In one embodiment, the audio controller 223 controls in a conventional manner an audio output 227, which may include for example, audio speakers, headphones, an audio receiver, an amplifier, or the like. In one embodiment, the audio controller 223 also controls, in a conventional manner, an audio input 225, which may include for example, a microphone, or input(s) from an audio or musical device, or the like.

The storage 211, in one embodiment, may include machine-readable media such as for example, but not limited to, a magnetic hard disk, a floppy disk, an optical disk, a read-only memory component ("ROM"), a smart card, or another form of storage for data. In one embodiment, the storage 211 may include removable media, read-only memory, readable/writable memory, or the like. Some of the data may be written by a direct memory access process into the memory 205 during execution of software in the computer system 201. It will be appreciated that software may reside in the storage 211, the memory 205, or may be transmitted or received via a modem or a communications interface 213. For the purpose of the specification, the term "machine-readable medium" shall be taken to include any medium that is capable of storing data, information, or encoding a sequence of instructions or operations for execution by the processor 203 to cause the processor 203 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

Figure 3:
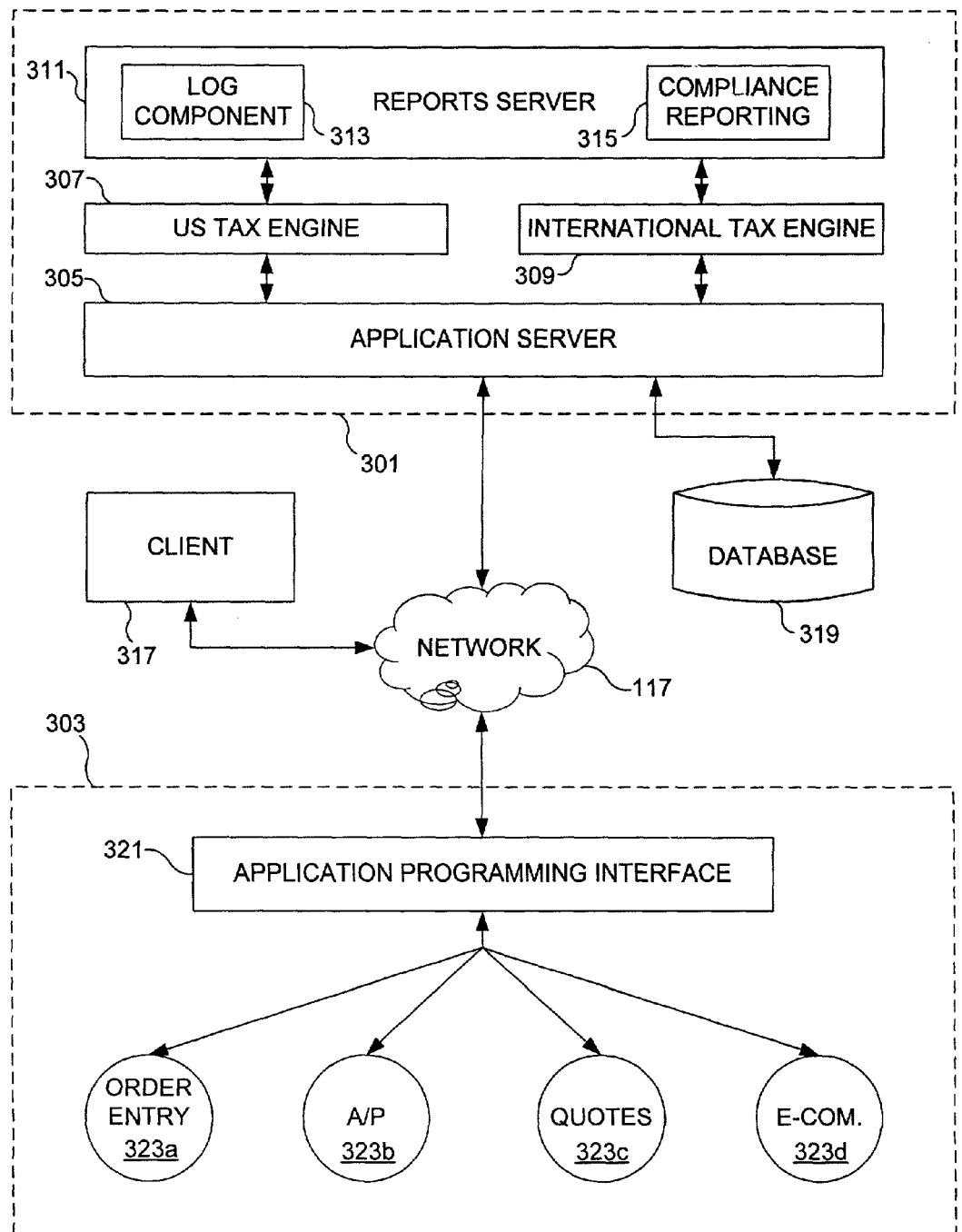
FIG. 3 is a block diagram of one embodiment of a client system and a server in accordance with the teachings of the present invention.
Figure 4:
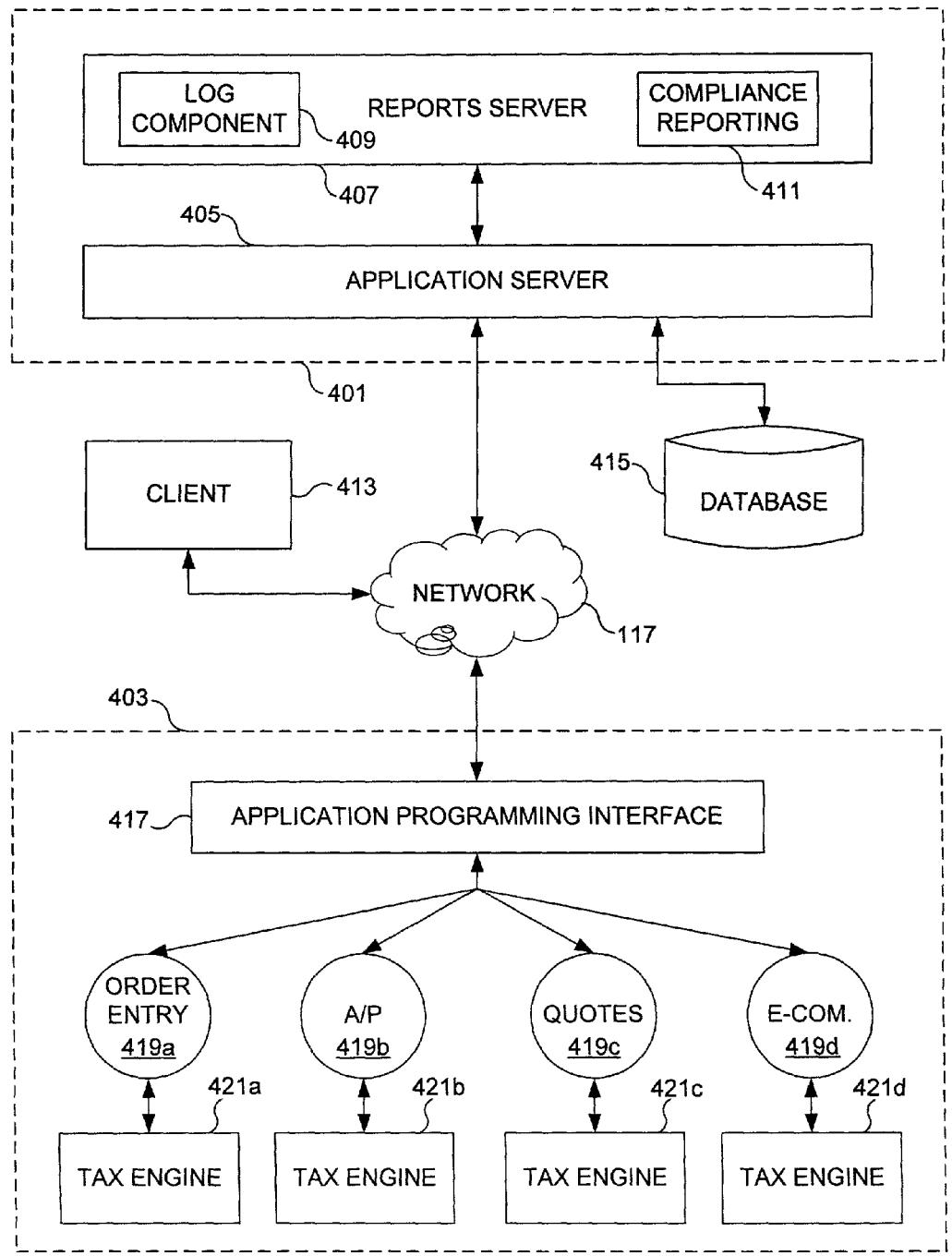
FIG. 4 is a block diagram of another embodiment of a client system and a server in accordance with the teachings of the present invention.

With reference now primarily to FIGS. 3 and 4, the reader will recall that embodiments in accordance with the teachings of the present invention provide a centralized transactional tax platform to enable an organization with multiple locations and/or multiple business applications to manage the configuration, administration, and reporting associated with global tax transactions. In one embodiment of a server and a client system environment, as illustrated in FIG. 3, the administration of tax compliance configuration data, the calculation of transaction taxes, and the storage and reporting of tax information are facilitated by server-side methodologies. In another embodiment of a server and a client system environment, as illustrated in FIG. 4, the administration of tax compliance configuration data, and the storage and reporting of tax information are facilitated by server-side methodologies, while the calculation of transaction taxes is facilitated by client-side methodologies incorporating dedicated tax engines.

With reference first to FIG. 3, a block diagram of one embodiment of a server 301 and a client system 303 is illustrated in accordance with the teachings of the present invention. The server 301 may represent the server 103 illustrated in FIG. 1, and the client system 303 may represent any of the client systems 105-115 illustrated in FIG. 1. In addition, another client system 317, illustrated in the depicted embodiment, may also represent any of the client systems 105-115 illustrated in FIG. 1, and may be used by a tax professional within the organization to manage and administer tax compliance configuration data and reporting for the organization as a whole, in an embodiment.

In one embodiment, the server 301 includes a plurality of software elements, including an application server 305, a domestic tax engine 307, an international tax engine 309, and a reports server 311. In one embodiment, the reports server 311 includes a log component 313 and a compliance reporting component 315. The plurality of software elements may comprise a single set of machine-readable instructions, in an embodiment. In another embodiment, the plurality of software elements may comprise distinct modules of machine-readable instructions capable of being integrated with one another to perform the methodologies in accordance with the teachings of the present invention.

In one embodiment, the application server 305 provides a software interface to receive information and/or data communicated to the server 301 from client systems (e.g., the client systems 303 and 317) via the network 117. The application server 305 may include an XML parser to read XML documents and provide access to their content and structure, in an embodiment. In addition, in one embodiment, the application server 305 provides a software interface to send information and/or data to client systems (e.g., the client systems 303 and 317), such as for example, an output of tax information generated by the domestic tax engine 307 or the international tax engine 309. In one embodiment, the application server 305 may also provide a UI to enable a tax professional to administer tax compliance configuration data used by the tax engines 307 and 309 to perform calculations, tax compliance reports or information, or the like.

In one embodiment, the application server 305 also provides a software interface to retrieve data from a communicatively coupled database 319, and/or to store data in the database 319. In one embodiment, the database 319 may comprise a database configured to store data, such as for example, but not limited to, rate tables and algorithms, product codes and cross references, customer data, location and nexus information, exceptions and exemptions to standard tax provisions within various tax jurisdictions and/or tax zones, audit data, computational logic and outputs, as well as a variety of compliance reports, and the like.

The data included in the database 319 may be retrieved by the application server 305 to enable the domestic tax engine 307 and/or the international tax engine 309 to calculate transaction taxes corresponding to various transactions, or to enable generation of reports via the compliance reporting component 315 of the reports server 311, in an embodiment. In another embodiment, data formatted by the log component 313 of the reports server 311 may be stored in the database 319 via the application server 305 to provide data warehousing capabilities for tax information, such as audit data, computational logic and outputs, and the like, generated by the tax engines 307 and 309.

In one embodiment, the client system 303 also includes a plurality of software elements, including an application programming interface ("API") 321 and a plurality of business applications 323a, 323b, 323c, and 323d. The plurality of business applications 323a-323d may be utilized by an organization to facilitate order entry (see, e.g., reference numeral 323a), accounts payable (see, e.g., reference numeral 323b), quotes (see, e.g., reference numeral 323c), and electronic commerce (see, e.g., reference numeral 323d), or the like, in various embodiments. It will be appreciated that individual business applications, or other combinations of business applications may be substituted for those described and illustrated herein in conjunction with FIG. 3.

In one embodiment, the API 321 provides a software interface for the client system 303 to encode information for transmission on, or to decode information received from, the network 117, which may vary according to the particular protocols used to communicate via the network 117. The API 321 may include an XML parser, as described above in conjunction with the application server 305, to read XML documents received by the client system 303 via the network 117. The API 321 may also include, in an embodiment, an XML serializer to serialize information included in an object model, for example, into an XML document for transmission on the network 117. The actual network transmissions may occur via a protocol, such as for example, hyper text transfer protocol ("HTTP"), or the like. Network transmissions such as these are well known to those skilled in the art, and will not be discussed in greater detail herein.

With reference now primarily to FIG. 4, a block diagram of another embodiment of a server 401 and a client system 403 is illustrated in accordance with the teachings of the present invention. In one embodiment, the server 401 includes a plurality of software elements, including an application server 405 and a reports server 407, the reports server 407 including a log component 409 and a compliance reporting component 411. As described above in conjunction with FIG. 3, the plurality of software elements may comprise a single set of machine-readable instructions, or may comprise distinct modules of machine-readable instructions capable of being integrated with one another to perform the methodologies in accordance with the teachings of the present invention in various embodiments. In one embodiment, the application server 405 may provide the same functions as those described above in conjunction with the application server 305 of FIG. 3.

In one embodiment, the client system 403 also includes a plurality of software elements, including an API 417 and a plurality of business applications 419a, 419b, 419c, and 419d. The plurality of business applications 419a-419d may be utilized by an organization to facilitate order entry (see, e.g., reference numeral 419a), accounts payable (see, e.g., reference numeral 419b), quotes (see, e.g., reference numeral 419c), and electronic commerce (see, e.g., reference numeral 419d), or the like, in various embodiments. As described above in conjunction with FIG. 3, single business applications, or other combinations of business applications may be substituted for the business applications described and illustrated in conjunction with FIG. 4. In one embodiment, each of the plurality of business applications 419a-419d may be coupled to a dedicated tax engine 421a, 421b, 421c, and 421d, respectively, to enable the calculation of transaction taxes corresponding to transactions facilitated by each of the respective business applications 419a-419d. In one embodiment, the API 417 provides a software interface for the client system 403 such as that described above in conjunction with the API 321 of FIG. 3.

The data included in the database 415 may be retrieved by the application server 405 for communication to the client system 403 to provide updates of tax compliance configuration data or rate tables, for example, to each of the dedicated tax engines 421a-421d, in an embodiment. In another embodiment, data formatted by the log component 409 of the reports server 407 may be stored in the database 415 via the application server 405 to provide data warehousing capabilities for tax information, such as audit data, computational logic and outputs, and the like, generated by the dedicated tax engines 421a-421d, and received from the client system 403 via the network 117. As described above in conjunction with FIG. 3, data utilized by the application server 405 may be administered and configured by an organization's tax professional via a UI provided at a client system 413, coupled to the server 401 via the network 117.

Figure 5A:
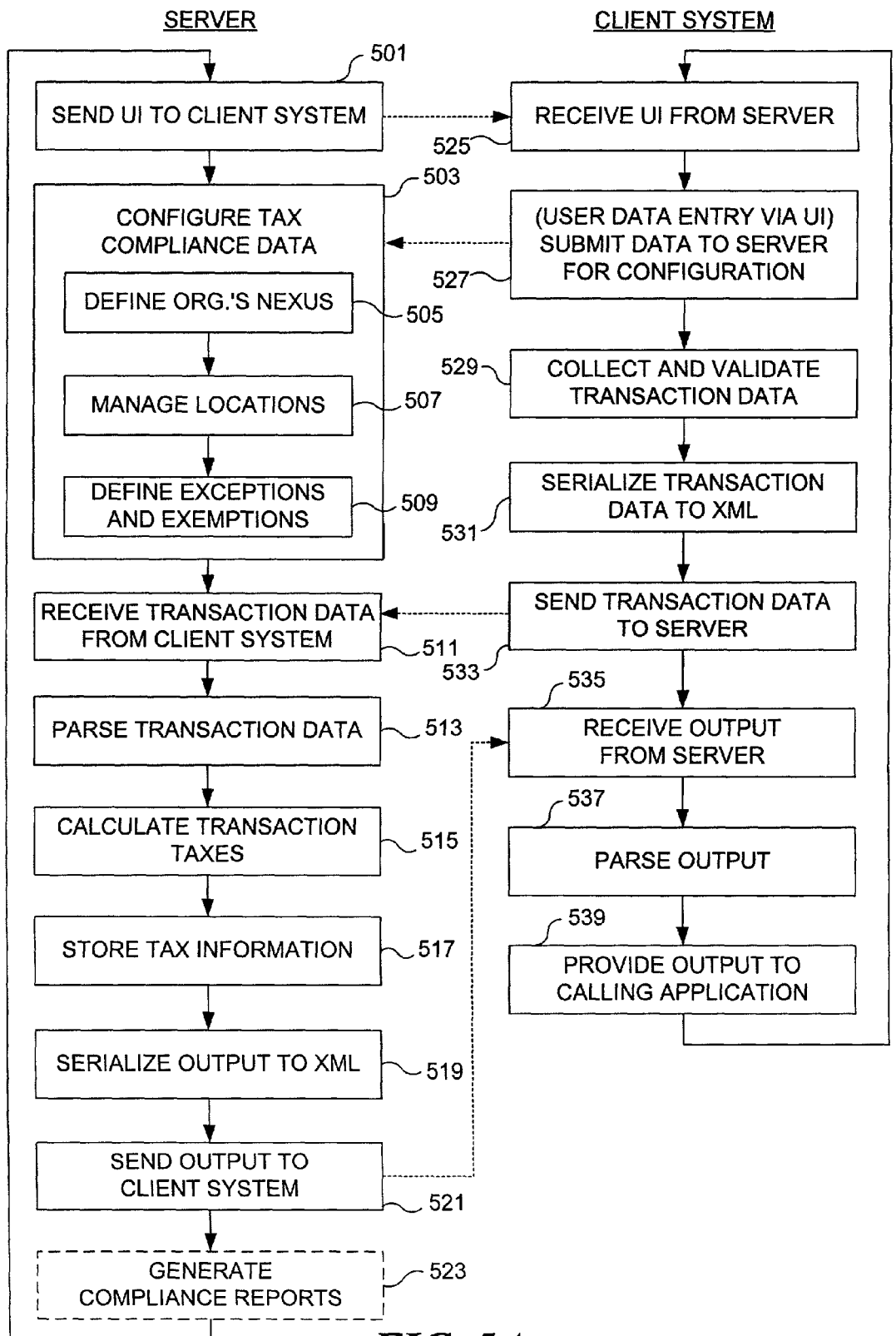
FIG. 5A is a flow diagram illustrating one embodiment of a flow of events in a server and in a client system in accordance with the teachings of the present invention.
Figure 5B:
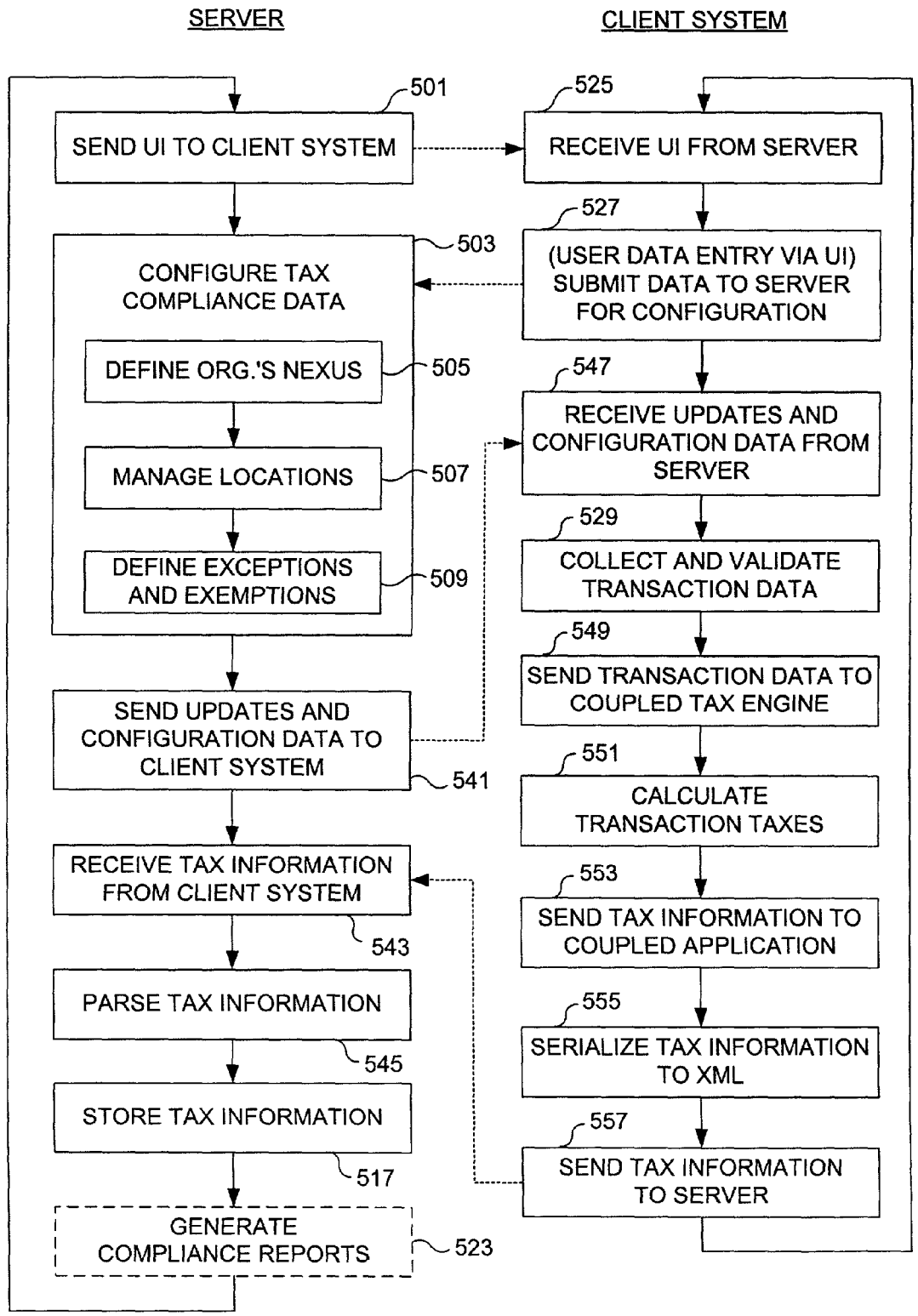
FIG. 5B is a flow diagram illustrating another embodiment of a flow of events in a server and in a client system in accordance with the teachings of the present invention.

With reference now primarily to FIGS. 5A and 5B, flow diagrams illustrating embodiments of a flow of events in a server and in a client system are shown in accordance with the teachings of the present invention. As the following description proceeds in conjunction with FIGS. 5A and 5B, reference is made to FIGS. 6A-11C to illustrate aspects of embodiments of the present invention. It will be appreciated that aspects of the present invention included in the following description may apply to the server 103 and any or all of the client systems 105-115 illustrated in FIG. 1, and may be implemented or facilitated by the hardware components of the computer described in conjunction with FIG. 2, and/or the software elements described in conjunction with FIGS. 3 and 4 above, in various embodiments in accordance with the teachings of the present invention.

With reference first primarily to FIG. 5A, one aspect of embodiments of the present invention is the provision of a graphical UI to enable a tax professional within an organization to administer tax compliance configuration data, such as product codes or other identifiers for goods and/or services bought and/or sold, exemption certificates, special tax rules, input filters, and the like, which impact the calculation of transaction taxes. Providing a graphical UI, which, in one embodiment, may be a browser-based UI accessible via a network link to the server, enables the tax professional to focus on tax strategy without having to approach the organization's information technology department to alter information that impacts the organization's tax calculations and compliance reporting.

The reader will appreciate that the tax professional may access the server (e.g., the server 301, FIG. 3) via a client system (e.g., the client system 317, FIG. 3) with a universal resource locator ("URL") or other unique address identifier associated with the server 301, in an embodiment. In response to a request sent from the browser, for example, of the client system 317, the server 301 may send the UI to the client system 317 (see, e.g., process block 501) as a series of pages that may be received by the client system 317 (see, e.g., process block 525), interpreted by the browser and/or a parser application, and displayed on a display coupled to the client system 317 (e.g., the display 219, FIG. 2). At this point, a user, such as the organization's tax professional, may enter information and/or data via the UI, and submit data to the server for configuration of at least one tax engine (e.g., the domestic tax engine 307 and/or the international tax engine 309, FIG. 3) (see, e.g., process block 527) that will calculate transaction taxes corresponding to transactions in which the organization or its subsidiaries, for example, participate (see, e.g., process block 527).

It will be appreciated that administration of tax compliance configuration data (see, e.g., process block 503), while indicated in FIG. 5A as occurring server-side, incorporates the user data entry and submission of that data to the server, as indicated by the client-side process block 527. The administration of tax compliance configuration data (see, e.g., block 503) comprises a number of elements that would be familiar to one skilled in the art. For purposes of explanation, the administration of tax compliance configuration data (see, e.g., block 503) may be broken down into four separate sections, including defining an organization's nexus (see, e.g., process block 505), managing locations (see, e.g., process block 507), defining exceptions and exemptions to standard tax provisions within various jurisdictions (see, e.g., process block 509), and administering registrations and zones (geographical areas organized based on transaction tax cross-border rules) for international tax compliance. It will be appreciated that additional elements of tax compliance configuration data not discussed herein may impact an organization's tax obligations, and that the following discussion is not intended to be all inclusive with regard to tax compliance procedures, or methods of tax calculation.

With consideration for the foregoing, one important concept in regard to domestic (e.g., the United States) transaction taxes is the idea of a nexus. A nexus represents an organization's legal obligation to collect and remit taxes in a particular jurisdiction. For example, a national department store may have a nexus in many jurisdictions, while an Internet merchant may have a nexus in only a few jurisdictions. In the international arena of transaction taxes, a registration with a taxing authority may serve a similar function.

In one embodiment, the UI sent to the client system (see, e.g., block 501) comprises displays, such as the example UI displays illustrated in FIGS. 6A and 6B, to enable the organization's tax professional to define the organization's nexus in accordance with the teachings of the present invention. It will be appreciated that a single individual or a group of individuals may be given the authority to access these elements of the UI, and to modify tax compliance configuration data. This individual or these individuals may be located at one location (e.g., see the client 105, FIG. 1), while the organization's transactions are occurring at different locations throughout the world (e.g., see the client systems 107-115, FIG. 1), in an embodiment.

With reference to FIGS. 6A and 6B, because of the large number of taxing jurisdictions in the United States (over 7,500 including states, counties, cities, and subsections of the foregoing), the tax professional may need to define the company's nexus to equate with the company's true tax obligations. It will be appreciated that a determination as to whether the company has a nexus with any one particular tax jurisdiction may be based on the particular tax laws and regulations specific to that tax jurisdiction, which is beyond the scope of the present invention. Typically however, the company's nexus will be related to its physical locations, or areas in which it does business or a substantial amount of business.

For example, the tax professional may define the company's nexus to include all of the states (e.g., Alabama, Alaska, Arizona, and Arkansas) listed on the example UT display illustrated in FIG. 6A by selecting the state tax indicator (see reference numeral 601). However, there may be particular local tax jurisdictions (e.g., cities), for example, within a state (e.g., Alabama), for which the company does not have a nexus, and therefore has no legal obligation to collect and remit taxes to a taxing authority (see reference numeral 603). Because the majority of local tax jurisdictions are included in the company's nexus in the particular state (e.g., Alabama), the tax professional may seek to define his or her company's local tax nexus by excluding only those cities, for example, that are not to be considered (see reference numeral 605). If, on the other hand, a majority of the local tax jurisdictions were to be excluded in a particular state, the tax professional could choose to "include" only those cities (see reference numeral 607), for example, that are to be considered for purposes of collecting and remitting transaction taxes. Similarly, the tax professional may define his or her company's nexus by including "none" of the local tax jurisdictions (see reference numeral 609), or he or she may include "all locale" tax jurisdictions (see reference numeral 611), depending on the particular circumstances.

If the tax professional later determines that the status of one or more of the local tax jurisdictions should be changed, he or she may "delete" (see reference numeral 613) that particular selection from the list of included or excluded local tax jurisdictions for a particular state (see, e.g., FIG. 6B). Similarly, the addition of other local tax jurisdictions may be facilitated by entering the city, for example, in a data entry field, and clicking an "add" button, for example (see reference numeral 615), with a cursor actuated by an input device such as a mouse.

If a particular set of nexus definitions apply to one or more divisions of a company, for example, while other nexus definitions apply to other divisions, the tax professional may define one or more "nexus groups" with different nexus characteristics that may be associated with the different divisions. For example, in the illustrated embodiment shown in FIG. 6A, a "default" nexus group (see reference numeral 617), which preliminarily may include all tax jurisdictions, in an embodiment, is shown. If no specific nexus group is defined for the company or a particular division, the default nexus group may be used in an embodiment.

With continued reference to FIG. 5A, in addition to defining the organization's nexus, the tax professional may also manage locations associated with the company's transactions. A significant component of any transaction tax determination is the location of the parties involved in the transaction. In the United States, each transaction must include information regarding each of four locations: A ship from location; a point of order origin ("POO") location; a point of order acceptance ("POA") location, and a ship to location. The ship from location generally refers to a location from which goods are being shipped, or a location at which services are being performed, for example a warehouse or a store. The POO location generally refers to a location at which an order for the goods or services is placed, for example a store or a trade show. The POA location generally refers to a location at which the order for the goods or services is accepted, for example a call center where an order was placed. The ship to location generally refers to a location at which a customer receives the goods or services that were purchased, for example the customer's business or home.

While information related to these locations could, in one embodiment, be provided to the server (e.g., the server 301, FIG. 3) with other transaction data for each transaction occurring at a particular location, many locations will be common to large numbers of transactions in which the company participates. For example, when our example company ships electronics to customers on the East Coast, they may always accept orders at a site in South Dakota, and ship from a warehouse located in New Jersey, for example. In this case, the ship from location and the POA location will always be identical, and there is no need to repetitively communicate information related to these locations with each transaction in order to calculate any applicable transaction taxes. Instead, a default location may be set up to apply to all transactions, unless otherwise indicated by the inclusion of specific location information.

Figure 7A:
FIGS. 7A-7B are illustrations of example UI displays to administer an organization's locations in accordance with the teachings of the present invention.
Figure 7B:
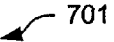

In regard to the foregoing, elements of the UI sent to the client system (e.g., the client system 317, FIG. 3) from the server 301 (see, e.g., block 501) may include UI displays to enable the tax professional to define information related to various locations, and to set default locations related to various transactions. FIGS. 7A and 7B are illustrations of example UI displays that enable the tax professional to configure location information and set default locations in accordance with the teachings of the present invention. For example, the tax professional may input address information related to a particular location (e.g., a Portland, Oreg.) (see reference numeral 701), and define this location to function as the default POA and POO locations for a particular location set (see reference numeral 703).

As with the nexus groups discussed above in conjunction with FIG. 6A, location sets may be defined to correspond to one or more client systems (e.g., client systems 105-115) so that location information need not be communicated with other transaction data for each transaction for which transaction taxes are to be calculated. For example, a "company" location set may be defined to include a default ship from location of Allston, Mass., and a POO and POA location of Portland, Oreg. (see, e.g., FIG. 7B). The specific information related to these locations may be defined on a UI display, such as that illustrated in FIG. 7A, and communicated only once to the server 301, thereby reducing the amount of transaction data that must be communicated to the server 301 to facilitate the calculation of transaction taxes corresponding to transactions occurring at the client systems (e.g., client systems 105-115) in various locations.

With continued reference to FIG. 5A, in addition to defining the organization's nexus, and managing locations corresponding to the organization, the tax professional may also define exceptions and exemptions to standard taxes within various tax jurisdictions (see, e.g., process block 509). In many transactions, different products may be taxed differently in the same tax jurisdiction, or the same product may be taxed differently in different tax jurisdictions. As a consequence, transaction data corresponding to product specifics is necessary in order to properly calculate transaction taxes.

In this regard, FIGS. 8A-8C are illustrations of example UI displays that enable the organization's tax professional to configure the organization's products and rules applied to those products in order to calculate transaction taxes in accordance with the teachings of the present invention. FIG. 8A provides a UI display to enable the tax professional to define a cross-reference between internal product codes (see reference numeral 803), which may be used by the company in invoices, or to track inventory, and the like, and a particular product code (see reference numeral 805) that may be used by the application executed by the server (e.g., the server 301, FIG. 3) to calculate transaction taxes corresponding to transactions related to the product. This allows specific rules to be defined for different products that may be treated the same for purposes of transaction tax calculations. For example, the company may sell different sizes or volumes of the same product, and identify these different sizes or volumes with different internal product codes. However, for purposes of transaction tax calculations, these different sizes or volumes of the same product may be treated identically, and therefore need only refer to a single product code to enable the calculation of appropriate taxes.

In addition, the tax professional may define various cross-reference groups (see reference numeral 801), and/or product groups (see reference numeral 807) to permit various divisions or subsidiaries of the organization to use different cross-reference schemes according to their needs. For example, two divisions of the same company may have a partially overlapping set of internal product codes, and in some cases the same internal product code may refer to two different products for purposes of transaction tax calculation. In this case, the two divisions of the same company could utilize different cross-reference groups (see reference numeral 801) to prevent confusion. Different product groups (see reference numeral 807) may be used to store modifications or customizations to products that are specific only to certain locations or divisions of the company, such as for example, if a division of the company has been granted certain tax advantages to spur technology investment in a specific tax jurisdiction.

FIGS. 8B and 8C illustrate example UI displays that enable the tax professional to define specific details related to a given product, in an embodiment. In these UI displays, the tax professional may define how specific products are handled in various tax jurisdictions. By default, products are taxed at certain rates in various state, county, and city tax jurisdictions. The rules, defined by the tax professional using the UI displays illustrated in FIGS. 8B and 8C, provide a capability to modify those basic rates for particular types of defined goods and/or services. For example, the state of Florida may not tax food, while the city of Miami may tax food, but at a special rate. By defining jurisdictional rules, the tax professional is able to define exactly how a product is specially handled within various tax jurisdictions.

In the embodiment depicted in FIGS. 8B and 8C, a product having product code "XYZ89" (see reference numeral 809), and defined as "Freight/Shipping charges" (see reference numeral 811) is "exempt" from state, county, city, and transit taxes within the states of "Alabama," "Illinois," and "Maine." In order to define whether the current product (e.g., the product corresponding to product code XYZ89) is exempt within a particular jurisdiction, subject to a standard tax rate, or subject to a custom tax rate, the tax professional may select the name of the state wherein the jurisdiction rule is to be defined by selecting the state (e.g., Alabama) from the pull-down list accessible at the bottom of the column labeled with reference numeral 833. In combination with this selection, the tax status of the product may then be defined by selecting "Exempt," "Standard," or "Custom" from the pull-down menus accessible at the bottom of the columns for each of the "State" (see reference numeral 825), the "County" (see reference numeral 827), the "City" (see reference numeral 829), and the "Transit" (see reference numeral 831) tax jurisdictions.

State, county, and city tax jurisdictions are those that were discussed above in conjunction with defining the organization's nexus. The transit tax jurisdiction corresponds to a tax collected at a secondary location, and generally corresponds to a shipment of goods. For example, shipping a computer from Houston, Tex. to Dallas, Tex., may require the payment of a sales tax in Houston (e.g., a city tax jurisdiction), as well as the payment of a transit tax in Dallas (e.g., a transit tax jurisdiction). In addition, the tax professional may set the effective date (see reference numeral 821) of any rules to enable a provision that will take effect in the future to be immediately available to ensure that appropriate taxes are calculated on all transactions occurring after that date.

In order to define custom tax rates for the current product (e.g., product code XYZ89) at a state-level, the tax professional may select a "state rules" tab (see reference numeral 813) and select the "dtls" (details) button (see reference numeral 819) to access the "rule details" UI display (see, e.g., FIG. 8C). In this display, the tax professional may define the "current rate," see the "prior rate," identify whether the maximum tax rate ("use max rate") should be used, the "effective date" for the maximum tax rate to take effect, the maximum tax "amount" for the current product within the current jurisdiction rule, the maximum amount that can be taxed ("taxable") for the current product within the current jurisdiction, and the maximum tax rate ("rate 1") for the current product that is to be charged after the "taxable" amount has been surpassed.

Similarly, exceptions to the county and city tax jurisdictions may be defined by selecting the county exceptions tab 815 and/or the city exceptions tab 817, and defining exceptions in a manner similar to that described above in conjunction with defining exceptions to the organization's nexus, in combination with a "rule details" UI display similar to that described above in regard to the "state rules" tab 813.

Since any standardized tax calculation and compliance platform cannot address every conceivable tax situation, embodiments in accordance with the teachings of the present invention also allow users (e.g., the company's tax professional) to customize the processing of transaction data if user-specified conditions are satisfied. This customization option, also referred to herein as an input filter, permits the tax professional or other administrator to define particular tax situations relevant to the company's business, and modify the processing of transaction data relevant to these particular tax situations. In one embodiment, a user-specified set (one or more) of incoming (to the tax engines 307, 309, or 421a-421d) XML elements may be compared to user-specified conditions, which if met, cause a modification or exception to standard processing of the transaction data included in the XML elements as specified by the tax professional, such as a tax rate adjustment or the like.

Input filters are basically combinations of conditions and actions. In one embodiment, the tax professional may create multiple filters and organize them in a hierarchical relationship such that if a condition in a top-level filter is met, then one or more lower level filters may also be tested. When conditions are met, corresponding defined actions are then performed to modify processing of the transaction data from standard procedures. For example, an input filter may be created that would, where the ship-to state is New York (condition), and the value of the item being sold is over $10 (condition), set the tax rate at 12% (action), in an embodiment.

Figures 9A, 9B:
FIGS. 9A-9B are illustrations of example UI displays to administer an organization's customers and any exemptions they may have in accordance with the teachings of the present invention.

In addition to the exceptions described above, the tax professional may also define a number of exemptions that may apply to the company's customers, or to the company in the case of purchase transactions. Exemption certificates are generally specific to products and/or tax jurisdictions, and may alter the transaction taxes that the company otherwise has an obligation to collect and remit, or pay themselves, to the respective tax jurisdictions. FIGS. 9A and 9B illustrate example UI displays that enable the tax professional to manage customer information (see, e.g., FIG. 9A), and to manage exemption certificates for those customers. It will be appreciated that a similar process may be used to administer exemptions for the company itself. The data entry fields corresponding to the manage customers UI display illustrated in FIG. 9A and the manage certificates UI display illustrated in FIG. 9B are relatively self explanatory and would be familiar to one skilled in the art familiar with tax calculation and exemption certificates. As such, in the interest of brevity, no additional explanation will be provided herein in this regard.

In a manner similar to that described above in regard to the administration and calculation of domestic transaction taxes, the tax professional in support of tax compliance in international jurisdictions must also define tax compliance configuration data to enable appropriate tax calculation and compliance reporting. Tax compliance configuration data in regard to the international arena generally falls into two basic categories: Shared international content, and company-specific international content. Shared international content defines the taxing world, including such things as geographical zones, taxing authorities, product exceptions, as well as global financial data considerations such as currencies, and the like. Company-specific international content generally includes product cross-references and registration information. These elements of international tax compliance configuration data will be discussed in greater detail below.

With continued reference to FIG. 5A, the tax compliance configuration data has been defined (see, e.g., block 503) by user data entry via the UI and submission of the data to the server (see, e.g., block 527). At this point, the client system (e.g., the client system 303, FIG. 3) collects and validates transaction data (see, e.g., process block 529) for transactions occurring at the client system 303 via one or more of the business applications 323a-323d (see, e.g., FIG. 3), in an embodiment. For example, an order entry may be facilitated via the "order entry" business application 323a, such as for example, the purchase of a number of office items. The "order entry" business application may be designed to ensure that all information necessary to the calculation of appropriate transaction taxes is provided before the transaction data is serialized to XML (see, e.g., process block 531), and sent to the server 301 (see, e.g., 533).

Figures 10A, 10B:
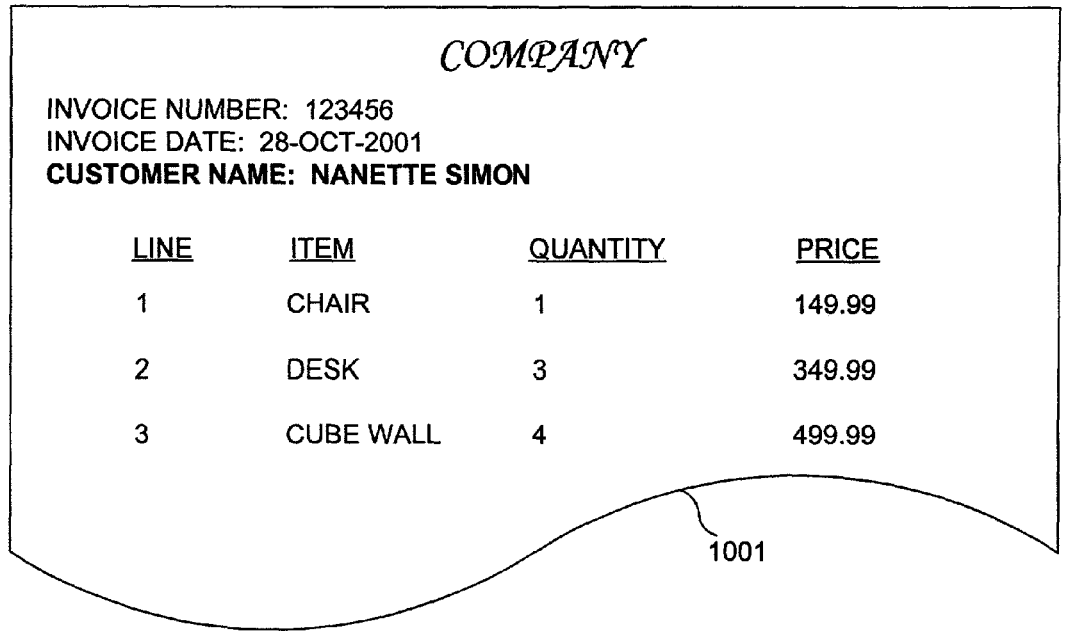
FIG. 10A is a pictorial illustration of an example invoice document in accordance with the teachings of the present invention.
FIG. 10B is an illustration representing a traditional data transfer method for electronically communicating information from the example invoice document of FIG. 10A in accordance with the teachings of the present invention.

For example, the information provided regarding the example transaction to purchase a number of office items may comprise information such as that provided on the example invoice 1001 illustrated in FIG. 10A in accordance with the teachings of the present invention. In fact, in one embodiment, the information provided may also be used to generate the invoice 1001 for the "company." In this instance, the invoice 1001 provides the customer name "Nanette Simon" as well as the line items detailing the products for which the customer has placed the order. The reader will appreciate that the customer name may be sufficient information to provide the tax calculation engine (e.g., the domestic tax engine 307, FIG. 3) at the server 301 with "ship to" location information, as well as any exemptions or special tax rates related to the customer or the products being ordered because this information may have previously been provided via the UI displays illustrated in FIGS. 9A and 9B, discussed above, in an embodiment.

With continued reference to the foregoing example, the customer has placed an order for three separate products in varying quantities, and each with a distinct price. In order to calculate applicable transaction taxes associated with this transaction between the company and the customer, all of this information (the "transaction data") must be sent to the server 301 for use by either the domestic tax engine 307 or the international tax engine 309, depending on the location of the company and/or the customer. In one embodiment, it may be possible to send the transaction data (see, e.g., block 533) via a data transfer method such as American Standard Code for Information Interchange ("ASCII") (see, e.g., FIG. 10B). One downside of such a data transfer method however, is that data must be sent in a very precise format in order to be interpretable by the processing application, for example the application server 305, at the server 301. As a consequence, transaction data such as the invoice number, the date, and the customer name must be repeated for each line item thereby creating redundancy, inefficiency in the network connection, and introducing additional potential for data integrity errors.

In contrast, and with reference to FIG. 10C, by incorporating the transaction data (see, e.g., block 531, FIG. 5A) included in the invoice 1001 (see, e.g., FIG. 10A) into elements of an XML document, and transmitting the transaction data (see, e.g., block 533, FIG. 5A) to the server 301 via the network 117 using HTTP or another appropriate protocol, the transaction data can be structured in a manner that makes it accessible to the processing application (e.g., the application server 305) as a compilation of structured elements within the XML document. This data transfer mechanism facilitates the transmission of only a single instance of information, such as for example, the invoice number (provided in the element "invoicenum"). Other elements of the XML document provide the customer name (e.g., the element "custname"), the respective product codes (e.g., the element "prodcode"), which may be converted to a product code used by the tax engines 307 and/or 309 to calculate transaction taxes via the cross-reference information provided previously by the tax professional, as discussed above in conjunction with FIG. 8A, and the like.

It will be appreciated that the processing application (e.g., the application server 305, FIG. 3) must be configured to interpret the elements of the XML document in order effectively utilize the transaction data contained therein. In this regard, in addition to a standard set of elements generally applicable to components of transaction data, such as the "prodcode," and "custname," mentioned above, and the like, customizable elements may also be provided at the invoice level and at the line level to enable the tax professional to define elements of transaction data that may be unique to his or her organization. For example, one customizable invoice element may be defined to correspond to a "store number" such that it could be used to transmit transaction data regarding the store from which the transaction was generated. The parent company of the store may be interested in tracking transactions in this manner, and thus providing this element of information enables records to be maintained which are specific to a particular store number, in an embodiment.

In addition to the various elements of the XML document referring to the specifics of the transaction (e.g., the "prodcode," "quantity," "grossamt," and the like), information regarding the company's role (e.g., buyer or seller) in the transaction must also be provided (see, e.g., element "merchant_role", FIG. 10C) to properly calculate transaction taxes, and to properly maintain records of tax information related to the transactions for reporting and remittance purposes. This information may help determine whether the company has an obligation to collect and remit taxes themselves, or whether they may recover taxes previously paid with regard to other transactions in which they may have played a different role. For example, a seller may have an obligation to pay a turnover tax, or to collect and remit a sales and use tax or a value added tax, while a buyer may want to maintain a record of value added taxes paid in order to recover those taxes when playing the role of the seller in a future transaction.

With continued reference to FIG. 5A, the server (e.g., the server 301) may then receive the transaction data from the client system (see, e.g., process block 511), and parse the transaction data (see, e.g., process block 513) from the XML document to make the content, incorporated into the elements of the XML document, accessible to other software elements such as the tax engines (e.g., the tax engines 307 and 309). The tax engines, for example the domestic tax engine 307 may then calculate any applicable transaction taxes corresponding to the transactions associated with the transaction data (see, e.g., process block 515), and the output from the tax engine 307 may then be stored in the database 319, for example, or other central storage coupled to the server, along with other tax information (see, e.g., process block 517) such as computational logic and the content and elements of the transaction data to facilitate the generation of reports or audit information. In one embodiment, the log component 313 of the reports server 311, illustrated in FIG. 3, may format the tax information for storage in the database 319.

The output from the tax engine 307, for example, may also be serialized to XML (see, e.g., process block 519) and sent to the calling client system 303 (see, e.g., process block 521) in a format designated by the tax professional, for example. In one embodiment, the tax professional may configure the output sent to the calling client system 303 to include particular elements of information. In one embodiment, the output may then be received by the client system 303 (see, e.g., process block 535), parsed to recover the content incorporated into the elements of the XML document (see, e.g., process block 537), and provided to the calling application (e.g., the business applications 323a-323d) (see, e.g., process block 539) to enable the business application to complete its transaction.

In one embodiment, the server 301 may then generate compliance reports (see, e.g., process block 523) and the like, based on the stored tax information, to identify taxes paid or owed, and to plan tax strategy for the company, or to remit taxes to the taxing authorities. In one embodiment, the compliance reporting component 315 of the reports server 311, illustrated in FIG. 3, may generate tax compliance reports, and the like.

With reference now primarily to FIG. 5B, another embodiment of a flow of events in a server (e.g., the server 401, FIG. 4) and a client system (e.g., the client system 403, FIG. 4) is illustrated in accordance with the teachings of the present invention. It will be appreciated that many of the process blocks illustrated in FIG. 5B are analogous to those illustrated in FIG. 5A, and have been identified with identical reference numerals. In these instances, as will be identified below, the reader may make reference to the discussion of the particular process block as described with reference to FIG. 5A so as to avoid repetitive discussion of these particular elements.

With regard to the foregoing discussion, the server (e.g., the server 401, FIG. 4) may send the UI to the client system (see, e.g., process block 501) to enable a tax professional or other system administrator to provide tax compliance configuration data that may be used for configuration of at least one tax engine (e.g., the tax engines 421a-421d, FIG. 4), in an embodiment. The client system (e.g., the client system 413, FIG. 4) may then receive the UI from the server 401 (see, e.g., process block 525), and submit data to the server 401 for configuration following user data entry via the UI (see, e.g., process block 527), in one embodiment. As discussed above, administering the tax compliance configuration data (see, e.g., process block 503) may include defining the organization's nexus (see, e.g., process block 505), managing location information (see, e.g., process block 507), defining exceptions and exemptions to standard tax provisions (see, e.g., process block 509), and/or administering registrations and zones (geographical areas organized based on transaction tax cross-border rules), in an embodiment.

Following administration of the tax compliance configuration data (see, e.g., block 503) via user input and submission from the client system 413 (see, e.g., block 527), the server 401 may send updates and/or configuration data to the client system 403 to enable configuration of the tax engines 421a-421d, in an embodiment (see, e.g., process block 541). The updates and configuration data may be communicated to the client system 403 via content incorporated into elements of an XIVIL document, in an embodiment. The client system 403 may then receive the updates and/or configuration data from the server 401 (see, e.g., process block 547) to configure the tax engines 421a-421d to enable calculation of transaction taxes based upon up-to-date information.

The client system 403 may then collect and validate transaction data via one or more of the business applications (e.g., the business applications 419a-419d, FIG. 4) (see, e.g., process block 529), and send the transaction data to a coupled tax engine (see, e.g., process block 549). In one embodiment, each coupled tax engine (e.g., the tax engines 421a-421d) is configured to receive transaction data generated from its respective business application (e.g., the business applications 419a-419d), to calculate any applicable transaction taxes (see, e.g., process block 551), and to send the output and other tax information to the coupled business application (see, e.g., process block 553) to be serialized to XML (i.e., incorporated into elements of an XML document) (see, e.g., process block 555), and sent to the server 401 (see, e.g., process block 557).

In one embodiment, the server 401 may then receive the tax information, including computational logic and outputs from the tax engines 421a-421d, as well as components of the transaction data (see, e.g., process block 543), parse the tax information to retrieve the content from the XML document (see, e.g., process block 545), and store the tax information in a database (e.g., the database 415, FIG. 4) or other central storage coupled to the server 401, in an embodiment. In one embodiment, the tax information is formatted for storage via the log component 409 of the reports server 407. The stored tax information may then be used to generate compliance reports (see, e.g., process block 523) via the compliance reporting component 411 of the reports server 407, in an embodiment.

It will be appreciated that although administration of the tax compliance configuration data, as discussed above in conjunction with FIGS. 5A and 5B, was described as occurring via a client system (e.g., the client systems 317 and 413, FIGS. 3 and 4, respectively) separate from the client system (e.g., the client systems 303 and 403, FIGS. 3 and 4, respectively) executing the business applications, the administration of the tax compliance configuration data may be facilitated by the client system executing the business applications, in another embodiment.

The foregoing description of embodiments in accordance with the teachings of the present invention has focused most prominently on aspects of the invention related to tax compliance configuration data corresponding to the calculation of domestic transaction taxes. As mentioned previously, the tax professional in support of tax compliance in international jurisdictions must also define tax compliance configuration data to enable appropriate tax calculation and compliance reporting. In one embodiment, the tax compliance configuration data necessary for the appropriate calculation of transaction taxes via an international tax engine (e.g., the international tax engine 309) may also be provided and administered via a UI similar to that described above in conjunction with FIGS. 6A-9B.

In the international arena, tax compliance configuration data corresponding to exceptions and exemptions to standard tax provisions may be defined and administered in a manner similar to that described above with regard to domestic transactions in FIGS. 8A-9B. In addition, zones (geographical areas organized based on transaction tax cross-border rules), taxing authorities, and registrations corresponding to the company must also be defined. Zones define the locations involved in an invoiced transaction, and may be associated with one or more taxing authorities. Taxing authorities are government entities that have authority to collect taxes corresponding to particular zones. In a manner similar to a company's nexus, as described above, registrations are then defined to correspond to taxing authorities, and represent the company's taxing and reporting obligations to particular taxing authorities with which they are associated.

Figure 11A:
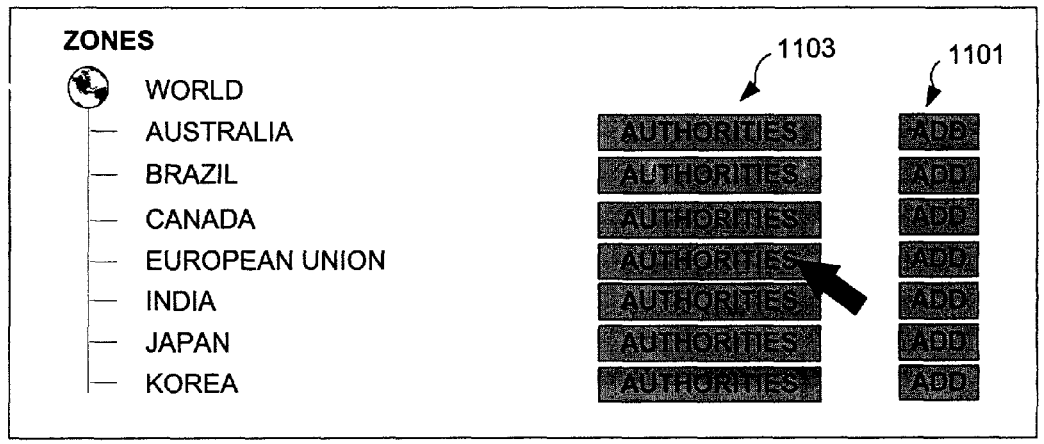
FIG. 11A is an illustration of an example UI display to administer an organization's zones in accordance with the teachings of the present invention.
Figure 11B:
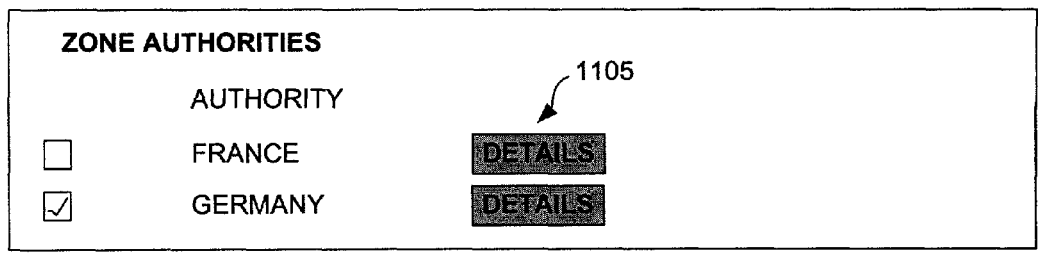
FIG. 11B is an illustration of an example UI display to administer an organization's taxing authorities in accordance with the teachings of the present invention.
Figure 11C:
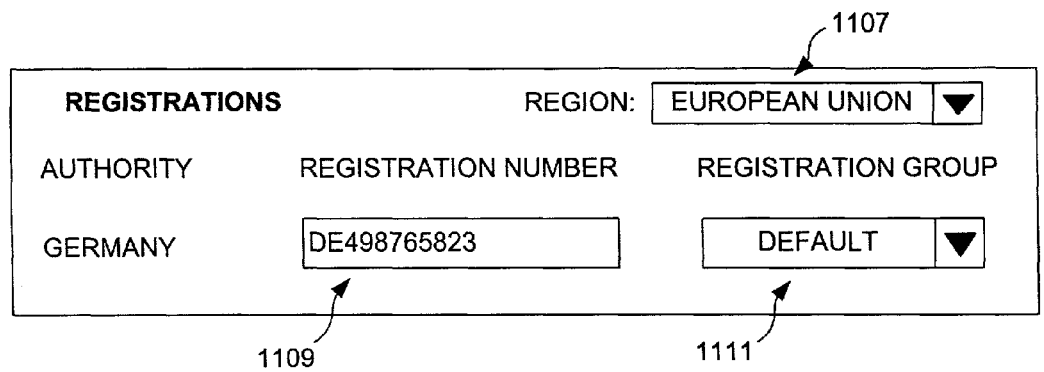
FIG. 11C is an illustration of an example UI display to administer an organization's registrations with taxing authorities in accordance with the teachings of the present invention.

With reference now to FIGS. 11A-11C, illustrations of example UI displays to administer the company's zones, taxing authorities, and registrations are shown in accordance with the teachings of the present invention. As illustrated in FIG. 11A, the company's tax professional or other administrator may select zones from a hierarchically arranged menu. In one embodiment, a zone may be added by selecting an "Add" button 1101 associated with the zone. The content of the menu may vary depending on the particular areas of the world that are supported by the tax calculation software utilized in embodiments of the present invention. For purposes of explanation, only a high-level menu is illustrated in FIG. 11A, but it will be appreciated that each respective country or region shown in the illustration may include a plurality of sub-categories. For example, "Canada" may include a second level of zones that includes each of the provinces, and in turn each province may correspond to a third level of the hierarchy from which various cities may be selected, and so forth.

In order to define specific taxing authorities to correspond to the selected zone(s), the tax professional may select an "Authorities" button 1103 associated with the zone. With reference now primarily to FIG. 11B, assume that the tax professional selected the "European Union" zone from the menu illustrated in FIG. 11A, which caused generation of a list of zone authorities (taxing authorities) to be displayed in the UI, as illustrated in FIG. 11B. A zone authority may then be selected by the tax professional to correspond to the "European Union" zone. In one embodiment, the tax professional may select a "Details" button 1105 corresponding to a taxing authority in order to define details associated with the authority, such as a registration mask that may be used to test whether registration numbers fit basic criteria for the authority, such as length or adherence to certain other rules.

For international tax calculations, the primary element of company-specific tax compliance configuration data is company registration information. The registration information allows the tax calculation engine to know where the company is registered and to appropriately calculate taxes and generate tax information for compliance reporting to the taxing authority. With reference now primarily to FIG. 11C, the tax professional may, in order to define registrations for the company, select a region (see reference numeral 1107) from a pull-down menu, in an embodiment. Registration information (e.g., registration numbers) (see reference numeral 1109) for each applicable authority may then be input in a data entry field. In one embodiment, a registration group (see reference numeral 1111) may be selected from a pull-down menu to which the registration may belong. Registration groups may provide an advantage when generating reports by allowing the generation of a single report for a group of closely related organizations. For example, several European countries allow multiple closely-related companies to share a single registration number, and these may be included in a W registration group.

Other elements of tax compliance configuration data may also be defined and administered via UI displays in a manner similar to that described above. Transaction data may then be generated from business applications, and input into one or more tax calculation engines to calculate applicable transaction taxes and to generate tax information for compliance reporting as described above in conjunction with the domestic transaction tax scenarios.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

What is claimed is:

1. A method comprising:
providing, from a central server to a client system located remotely from the central server, a graphical user interface configured with tax compliance configuration data entry fields including plural user-selectable taxable transaction location options and product code cross-reference group options and a user-selectable tax rate modification field;
receiving, at the central server, tax compliance configuration data transmitted from the client system, the tax compliance configuration data including transaction location management data corresponding to a user selection from among the plural user-selectable taxable transaction location options of the graphical user interface;
generating, at the central server, tax engine configuration data based on the received tax compliance configuration data, wherein the tax engine configuration data is specifically configured, when executed on the client system, to configure a transaction tax calculation engine coupled with the client system to calculate a tax on a transaction according to the tax compliance configuration data;
communicating the specifically configured tax engine configuration data from the central server to the client system;
receiving tax information at the central server from the client system, wherein the tax information includes transaction taxes calculated by the tax engine according to the tax engine configuration data; and
storing, at a central storage of the central server, the received tax information.

2. The method of claim 1, wherein the tax information is incorporated into elements of an extensible markup language document.

3. The method of claim 1, wherein the tax compliance configuration data are incorporated into an extensible markup language document prior to communicating the tax compliance configuration data to the client system.

4. The method of claim 1, wherein the tax compliance configuration data include information specifying either or both of transaction tax registrations and transaction tax zones.

5. The method of claim 1, wherein the tax compliance configuration data include information defining exceptions to and exemptions from standard tax provisions.

6. The method of claim 1, further comprising:
customizing the tax compliance configuration data in a hierarchical relationship by way of multiple filters.

7. The method of claim 1, wherein the tax compliance configuration data include a selection of at least one international tax zone.

8. The method of claim 1, further comprising:
generating, at the central server, a tax compliance report regarding compliance of the tax information relative to at least one taxing authority.

9. The method of claim 1, wherein the tax engine is an international tax engine.

10. An article of manufacture, comprising:
a non-transitory machine-readable medium having instructions encoded thereon, including instructions which when executed on a server, are configured to cause the server to:
communicate from the server to a client system a graphical user interface configured with tax compliance configuration data entry fields, wherein the tax compliance configuration data entry fields include plural user-selectable taxable transaction location options and product code cross-reference group options and a user-selectable tax rate modification field;
receive, from the client system, and process tax compliance configuration data derived from one or more of the tax compliance configuration data entry fields of the user interface including as user selection from among the plural user-selectable taxable transaction location options;
generate tax engine configuration data based on the tax compliance configuration data, wherein the tax engine configuration data is specifically configured, when executed on the client system, to configure as transaction tax calculation engine coupled with the client system to calculate a tax on a transaction according to the tax compliance configuration data;
communicate the specifically configured tax engine configuration data from the server to the client system;
receive tax information at the server from the client system and process the tax information, wherein the tax information includes transaction taxes calculated by the tax engine according to the tax engine configuration data, and;

store the tax information in a central storage of the server.

11. The article of manufacture of claim 10, wherein the tax information is incorporated into elements of an extensible markup language document, and the instructions to process the tax information include instructions to parse the extensible markup language document.

12. The article of manufacture of claim 10, wherein the instructions to process the tax compliance configuration data include instructions to incorporate the tax compliance configuration data into an extensible markup language document prior to communication of the tax compliance configuration data to the at least one client system.

13. The article of manufacture of claim 10, wherein the tax compliance configuration data include nexus information.

14. The article of manufacture of claim 10 wherein the tax compliance configuration data include: location information.

15. The article of manufacture of claim 10, wherein the instructions are further configured, when executed on the server, to cause the server to generate a tax compliance report regarding compliance of the tax information relative to at least one taxing authority.

16. The article of manufacture of claim 10, wherein the tax compliance configuration data include a selection of at least one global geographic zone.

17. The article of manufacture of claim 10, wherein the tax compliance configuration data include a selection of at least one taxing authority.

18. The article of manufacture of claim 10, wherein the tax compliance configuration data include taxation registration information.

19. An apparatus, comprising:
a processor;
a memory, coupled to the processor, to store a plurality of instructions; and
a communications interface coupled with the processor and configured to communicate with a client system located remotely relative to the apparatus via a network, wherein, execution of the plurality of instructions by the processor causes the apparatus to:
generate a graphical user interface, wherein the graphical user interface is configured with tax compliance configuration data entry fields including plural user-selectable taxable transaction location options and product code cross-reference group options and a user-selectable tax rate modification field;
provide, via the communications interface, the user interface to a client system;
receive from the client system, via the communications interface, tax compliance configuration data corresponding to a user selection from among the plural user-selectable taxable transaction location options;
configure tax engine, configuration data based on the received tax compliance configuration data;
configure, using the tax engine configuration data, at least one tax engine coupled with the apparatus;
receive from the client system, via the communications interface, transaction data corresponding to a taxable transaction;
parse the transaction data;
activate the at least one tax engine;
calculate, by the tax engine, transaction taxes corresponding to the parsed transaction data;
store tax information including the calculated, transaction taxes in a central storage coupled to the apparatus; and
send to the client system, via the communications interface, the tax information including the calculated transaction taxes.

20. The apparatus of claim 19, wherein execution of the plurality of instructions by the processor further causes the apparatus to:
incorporate the tax information into elements of an extensible markup language document prior to sending the tax information to the client system.

21. The apparatus of claim 19, wherein execution of the plurality of instructions by the processor further causes the apparatus to:
generate a tax compliance report.

22. A method of operating a tax information system, comprising:
providing from a central server a graphical user interface to a client system located remotely from the central server, wherein the graphical user interface is configured with tax compliance configuration data entry fields including plural user-selectable taxable transaction location options and product code cross-reference group options and a user-selectable tax rate modification field;
receiving, at the central server, tax compliance configuration data transmitted from the client system, wherein the tax compliance configuration data includes transaction location management data corresponding to a user-selection from among the plural user-selectable taxable transaction location options;
generating, at the central server, tax engine configuration data based on the tax compliance configuration data, wherein the tax engine configuration data is specifically configured, when executed on the central server, to configure a transaction tax calculation engine of the central server to calculate a tax on a transaction according to the tax compliance configuration data;
communicating the specifically configured tax engine configuration data to a transaction tax calculation engine of the central server;
receiving from the client system, at the central server, validated transaction information relating to a taxable transactions;
parsing the transaction information;
processing each of the tax engine configuration data and the parsed transaction information at the transaction tax calculation engine of the central server, wherein the processing includes calculating taxes corresponding to the taxable transaction information;
storing, at the first server, tax information including the calculated taxes;
serializing the tax information to a markup language; and
sending the serialized tax information to the client system.

23. The method of claim 22, further comprising:
generating, at the central server, a tax compliance report regarding compliance of the tax information relative to at least one taxing authority.

24. A method of operating a tax information system, comprising:
providing a graphical user interface from a central server to a first client system, wherein the graphical user interface is configured with tax compliance configuration data entry fields including plural user-selectable taxable transaction international location options and product code cross-reference group options and a user-selectable tax rate modification field;
activating at least one tax engine at the central server, including an international tax engine;

receiving at the central server tax compliance configuration data from the first client system through the user interface, wherein the tax compliance configuration data includes data specified by a user at the transaction location management data entry fields;

input filtering the tax compliance configuration data to customize global tax compliance configuration data responsive to the user-specified transaction location management data, such that the customized global tax compliance configuration data are specific to the data specified by the user at the first client system;

configuring the at least one tax engine with the customized global tax compliance configuration data calculating, by the at least one tax engine, a transaction tax based on transaction data received from the first client system; and generating at least one global tax compliance report for the first client system, wherein the at least one global tax compliance report including information corresponding to the calculated transaction tax.

* * * * *

UNITED STATES PATENT AND TRADEMARK OFFICE
CERTIFICATE OF CORRECTION

| | | |
|---|---|---|
| PATENT NO. | : 8,099,342 B1 | Page 1 of 1 |
| APPLICATION NO. | : 10/037035 | |
| DATED | : January 17, 2012 | |
| INVENTOR(S) | : Eric Thomas Christian and John Davidson Brandt | |

It is certified that error appears in the above-identified patent and that said Letters Patent is hereby corrected as shown below:

IN THE CLAIMS:

Column 20:
Claim 10, at line 37, replace "instructions which when executed" with: --instructions which, when executed--;
Claim 10, at line 50, replace "including as user selection" with: --including a user selection--;
Claim 10, at line 56, replace "to configure as transaction" with: --to configure a transaction--.

Column 21:
Claim 14, at line 16, replace "of claim 10 wherein the tax" with: --of claim 10, wherein the tax--;
Claim 14, at line 17, replace "configuration data include: location" with: --configuration data include location--;
Claim 19, at line 54, replace "configure tax engine, configuration data" with: --configure tax engine configuration data--;
Claim 19, at line 65, replace "the calculated, transaction taxes" with: --the calculated transaction taxes--.

Signed and Sealed this
First Day of May, 2012

David J. Kappos
*Director of the United States Patent and Trademark Office*